United States Patent
Sato

(10) Patent No.: US 7,289,238 B2
(45) Date of Patent: Oct. 30, 2007

(54) OPTION FUNCTION SETUP METHOD FOR INFORMATION PROCESSING APPARATUS, AND FOR IMAGE FORMING APPARATUS

(75) Inventor: Hirochika Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 10/440,232

(22) Filed: May 19, 2003

(65) Prior Publication Data

US 2003/0218768 A1    Nov. 27, 2003

(30) Foreign Application Priority Data

May 21, 2002    (JP)    ............... 2002-145897

(51) Int. Cl.
*G06F 3/12*    (2006.01)
*G06F 15/00*    (2006.01)
(52) U.S. Cl. ...................... 358/1.15; 359/1.9
(58) Field of Classification Search ............ 358/1.1, 358/1.9, 1.15, 1.13, 500, 501, 3.15, 400, 358/401; 710/7, 8, 46; 709/223, 224, 228, 709/229
See application file for complete search history.

(56) References Cited

U.S. PATENT DOCUMENTS 6,426,800 B1 * 7/2002 Mizuno et al. ............ 358/1.15
7,092,119 B1 * 8/2006 Hinds et al. .................. 358/1.9

FOREIGN PATENT DOCUMENTS

| JP | 10-097390 | 4/1998 |
|----|-----------|--------|
| JP | 2001-092618 | 4/2001 |
| JP | 2002011924 A * | 1/2002 |

* cited by examiner

*Primary Examiner*—Douglas Q. Tran
(74) *Attorney, Agent, or Firm*—Fitzpatrick, Cella, Harper & Scinto

(57) ABSTRACT

In a case where only one image forming apparatus ID stored in a PC coincides with an own ID of an image input/output system itself stored in this system, it is controlled to set up the option function of the image input/output system according to information concerning validation and invalidation of an option function of the image input/output system instructed on the PC side, while in a case where only one image forming apparatus ID does not coincide with the own ID of the image input/output system itself, it is controlled not to set up the option function of the image input/output system according to the information instructed on the PC side, thereby preventing that a user unfairly duplicates a setup program with an evil intention, and thus can set up the option function to the plural image forming apparatuses by purposely duplicating the setup program.

4 Claims, 13 Drawing Sheets

FIG. 14

STORAGE MEDIUM SUCH AS FD,
CD-ROM OR THE LIKE

| DIRECTORY INFORMATION |
|---|
| 1ST PROC PROGRAM (EXTERNAL APPARATUS) PROGRAM CODE GROUP CORRESPONDING TO STEPS OF FLOW CHART SHOWN IN FIG. 7A |
| 1ST PROC PROGRAM (IMAGE FORMING APPARATUS) PROGRAM CODE GROUP CORRESPONDING TO STEPS OF FLOW CHART SHOWN IN FIG. 7B |
| 2ND PROC PROGRAM (EXTERNAL APPARATUS) PROGRAM CODE GROUP CORRESPONDING TO STEPS OF FLOW CHART SHOWN IN FIG. 13A |
| 2ND PROC PROGRAM (IMAGE FORMING APPARATUS) PROGRAM CODE GROUP CORRESPONDING TO STEPS OF FLOW CHART SHOWN IN FIG. 13B |
|  |

MEMORY MAP OF STORAGE MEDIUM

OPTION FUNCTION SETUP METHOD FOR INFORMATION PROCESSING APPARATUS, AND FOR IMAGE FORMING APPARATUS

BACKGROUND OF THE INVENTION

1. Field of the Invention

The present invention relates to an information processing apparatus which can perform an option function setup to set up an option function of an image forming apparatus from an external apparatus, an image forming apparatus which can perform an option function setup, an option function setup method, an option function setup method for the information processing apparatus, an option function setup method for the image forming apparatus, a program which executes the option function setup method, and a storage medium which stores the program for executing the option function setup method.

2. Related Background Art

Conventionally, as a setup method of providing a setup program to a user for counter value and thereby validating or invalidating an option function of an image forming apparatus owned by the user, there is a method that a setup program is executed in an external apparatus connected through a communication medium to the image forming apparatus being operating in a setup mode, an option function flag stored in a storage medium of the image forming apparatus is thereby validated or invalidated, and thereafter the setup program itself is deleted from the external apparatus.

However, the above method premises that one setup program is provided for counter value in regard to only one image forming apparatus owned by the user. Therefore, to validate the option function for plural image forming apparatuses, it is necessary to buy the plural setup programs of the number same as the number of the image forming apparatuses. However, in such a case, there is a fear that, if a user who owns only one setup program illegally or unfairly duplicates it with an evil intention, the option function is validated for the plural image forming apparatuses.

SUMMARY OF THE INVENTION

An object of the present invention is to provide an information processing apparatus, an image forming apparatus, an option function setup method, an option function setup method for the information processing apparatus, an option function setup method for the image forming apparatus, a program for executing the option function setup method, and a storage medium for storing the program, which all solved the above problem.

Another object of the present invention is to provide an information processing apparatus, an image forming apparatus, an option function setup method, an option function setup method for the information processing apparatus, an option function setup method for the image forming apparatus, a program for executing the option function setup method, and a storage medium for storing the program, which all can prevent a conventional drawback that a user who has an evil intention (or a malicious user) can set up the option function to plural image forming apparatuses by purposely duplicating the setup program. Thus, even if the user who has the evil intention illegally or unfairly duplicates the setup program, it is merely possible to set up the option function for only one image forming apparatus.

Other objects and features according to the present invention will become apparent from the following description taken in conjunction with the accompanying drawings, in which like reference characters designate the same or similar parts throughout the figures thereof.

BRIEF DESCRIPTION OF THE DRAWINGS

FIG. 14 is a typical view for explaining an example of a memory map of a storage medium which stores various data processing programs capable of being read by the system to which the information processing apparatus and the image forming apparatus according to the present invention are applicable.

DESCRIPTION OF THE PREFERRED EMBODIMENTS

Hereinafter, the preferred embodiments of the present invention will now be described in detail with reference to the accompanying drawings.

First Embodiment

First, the entire structure of a system to which an information processing apparatus and an image forming apparatus both according to the first embodiment of the present invention are applicable will be explained.

Figure 1:
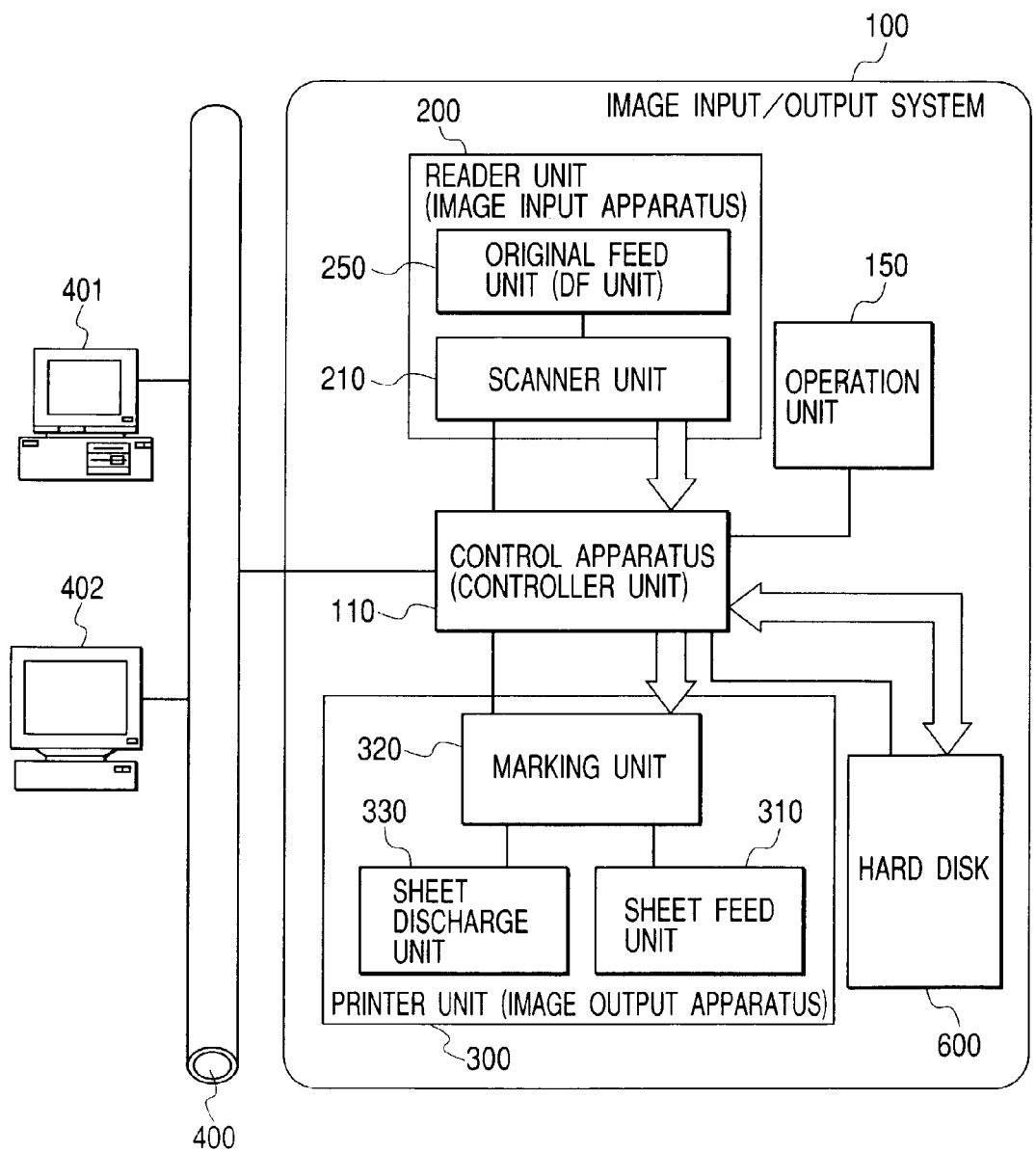
FIG. 1 is a block diagram showing the entire structure of a system to which an information processing apparatus and an image forming apparatus both according to the first embodiment of the present invention are applicable.

FIG. 1 is a block diagram showing the entire structure of the system to which the information processing apparatus and the image forming apparatus according to the first embodiment are applicable.

In FIG. 1, numeral 200 denotes a reader unit (or an image input apparatus) which optically reads an image of an original (or an original image) and converts the read image into image data (or print data). The reader unit 200 includes a scanner unit 210 which has a function to read the original image, and an original feed unit (or a document feeder (DF) unit) 250 which has a function to feed and transport the original.

Numeral 300 denotes a printer unit (or an image output apparatus) which transports a recording sheet (or a recording paper), prints the image data on the transported recording sheet as a visible image, and then outwardly discharges the recording sheet on which the visible image has been printed. Incidentally, the printer unit 300 includes a sheet feed unit 310 which contains plural kinds of recording sheet cassettes, a marking unit 320 which has a function to transfer and fix the print data to the recording sheet, and a sheet discharge unit 330 which has a function to perform a sorting process and a stapling process to the recording sheets on which the images have been respectively printed, and to discharge the processed recording sheets outside the printer unit 300.

Furthermore, numeral 110 denotes a control apparatus (or a controller unit) which is electrically connected to the reader unit 200, the printer unit 300 and a hard disk 600, and is further connected to host computers (or PC's) 401 and 402 through a network (or a local area network (LAN)) 400.

The controller unit 110 includes a CPU, a ROM, a RAM and the like which are all not shown. Thus, the CPU which reads and executes a program stored in the ROM, the hard disk 600 or other recording medium controls based thereon the reader unit 200 to read the print data of the original and controls the printer unit 300 to execute a copy function to output the print data on the recording sheet. Moreover, the controller unit 110 includes a scanner function to convert the print data read from the reader unit 200 into code data and then transmit the converted code data to the host computer through the network 400, and a printer function to convert code data received from the host computer through the network 400 into print data and then output the converted print data to the printer unit 300. In addition, the controller unit 110 includes a function to store the print data in the hard disk 600.

Numeral 150 denotes an operation unit which is connected to the controller unit 110 and consists of a liquid crystal touch panel acts as a user interface (UI) which is used to operate or handle an image input/output system.

Furthermore, numeral 100 denotes the image input/output system (or an image forming apparatus), and numerals 401 and 402 denotes the host computers (PC's). On one hand, each of the host computers (PC's) 401 and 402 may be called an external apparatus.

Here, although the structure that the external apparatus and the image forming apparatus are connected to each other through the LAN 400 is explained, these apparatuses may be connected through a Centronics parallel cable or the like.

Moreover, although the case where the reader unit 200, the printer unit 300, the hard disk 600 and the controller unit 110 together constitute an integrational apparatus (or an integrational system) is mainly explained by way of example in the present embodiment, each of these units may be provided independently.

Moreover, although the image forming apparatus or the image input/output system according to the present embodiment is mainly explained as a multifunctional apparatus or system which includes the scanner function, the copy function, a facsimile function, a printer function and the like as described above, the present invention is also applicable to a single-functional apparatus or system which includes at least one of the above plural functions.

As above, the present invention is applicable to any kinds of device structures, system configurations and functions which can achieve the processes shown in various flow charts later described and other processes equivalent thereto.

Figure 2:
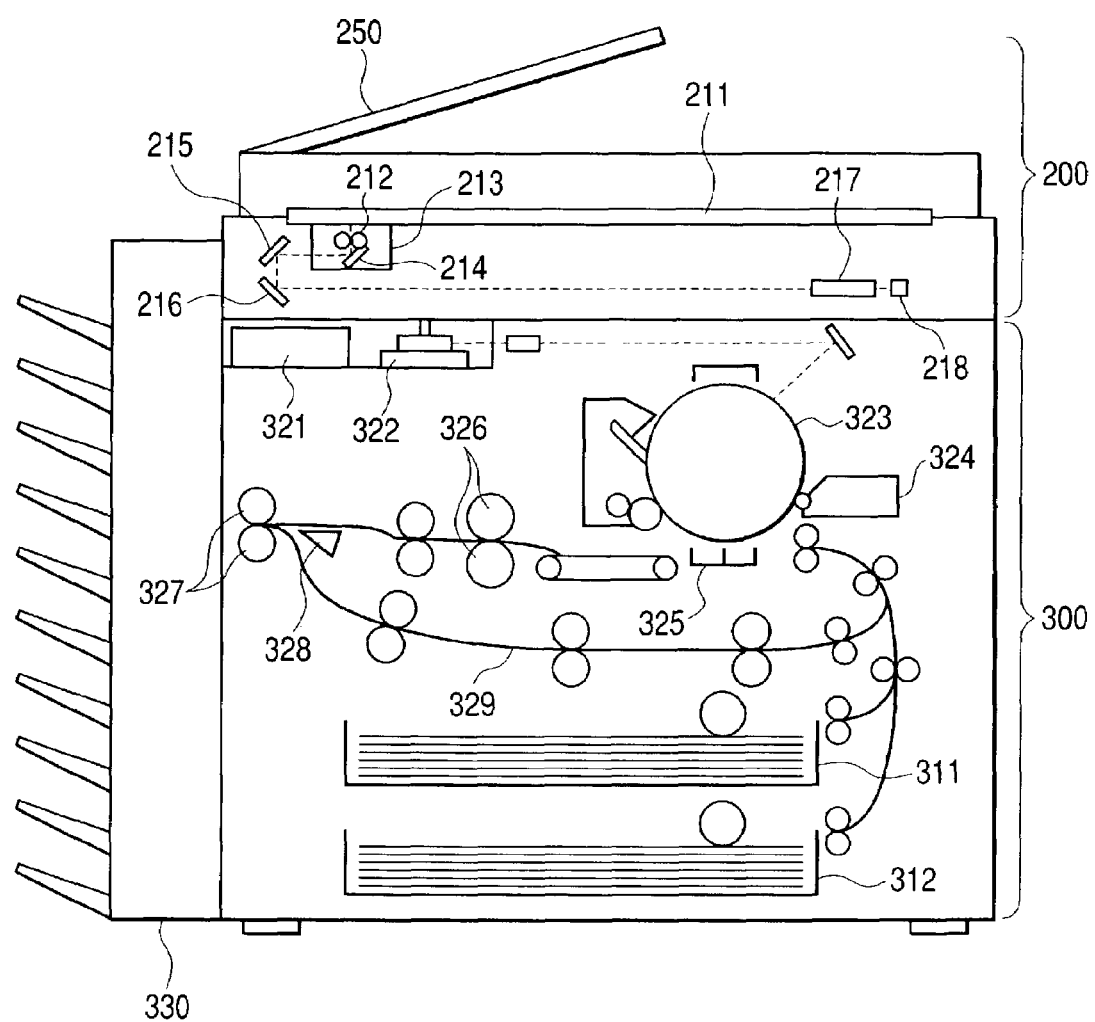
FIG. 2 is a cross section diagram showing the structures of a reader unit and a printer unit both shown in FIG. 1.

FIG. 2 is a cross section diagram showing the structures of the reader unit 200 and the printer unit 300 which are shown in FIG. 1.

In the reader unit 200, numeral 250 denotes an original feed unit (or a document feeder (DF) unit) which feeds one by one the originals in page order onto a platen glass 211, and further discharges the original from the platen glass 211 after an original reading operation ended.

When the original is fed and transported onto the platen glass 211, a lamp 212 is turned on, and movement of an optical unit 213 is started, whereby the original is exposed and scanned. Then, reflection light from the original at this time is introduced into a CCD image sensor (or a CCD simply) 218 through mirrors 214, 215 and 216 and a lens 217, whereby the image of the scanned original is read by the CCD 218. Subsequently, image data output from the CCD 218 is subjected to a predetermined process and then transferred to the controller unit 110.

On one hand, in the printer unit 300, numeral 321 denotes a laser driver, which drives a laser beam generation unit 322 to generate a laser beam according to the image data output from the controller unit 110. The generated laser beam is irradiated on a photosensitive drum 323, a latent image according to the irradiated laser beam is thus formed on the photosensitive drum 323, and a developer is adhered to the portion of the latent image on the photosensitive drum 323 by a developing unit 324.

Incidentally, a recording sheet is fed from either a cassette 311 or a cassette 312 to a transfer unit 325 at timing synchronized with a start of the laser beam irradiation, whereby the developer adhered on the photosensitive drum 323 is transferred to the recording sheet in the transfer unit 325. The recording sheet on which the developer has been transferred is then transported to a fixing unit 326, whereby the developer is fixed to the recording sheet by heat and pressure applied in the fixing unit 326. The recording sheet, which passed the fixing unit 326, is discharged by discharging rollers 327. Then, a sheet discharging unit 330 sheaves, sorts and/or staples the recording sheets discharged by the discharging rollers 327.

Incidentally, in a case where double-sided recording is set, the recording sheet is once transported up to the discharging rollers 327. After then, the rotation direction of each of the discharging rollers 327 is reversed, and the recording sheet is thus introduced into a sheet refeed path 329 by a flapper 328. The recording sheet which has been introduced in the sheet refeed path 329 is again fed to the transfer unit 325 at the above timing.

Figure 3:
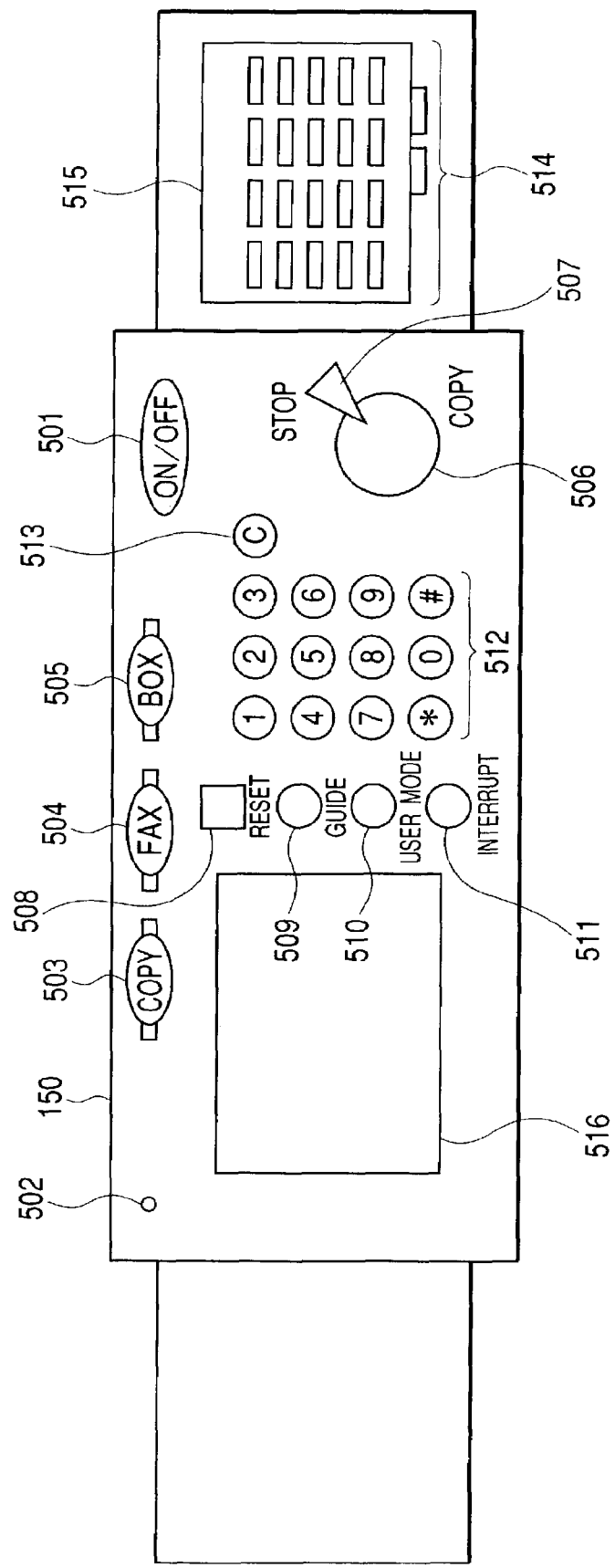
FIG. 3 is a plan view showing the configuration of an operation unit shown in FIG. 1.

FIG. 3 is a plan view showing the configuration of the operation unit 150 shown in FIG. 1.

In FIG. 3, numeral 502 denotes a power lamp which indicates whether the power source of the copying machine has been turned on. That is, if the power source is turned on by depressing a power switch 501, the power lamp 502 is lit.

Numeral 503 denotes a copy function selection key which is used to select the copy function. If a copy function mode is set by depressing the copy function selection key 503, a copy job which has been read and obtained by the scanner unit 210 can be printed by the printer unit 300 in accordance with an output processing condition for the copy job set by a user through the operation unit 150. Numeral 504 denotes a facsimile function selection key which is used to select the facsimile function. If a facsimile function mode is set by depressing the facsimile function selection key 504, a facsimile job which has been read and obtained by the scanner unit 210 can be facsimile-transmitted to the external apparatus in accordance with a processing condition for the facsimile job set by the user through the operation unit 150. Numeral 505 denotes a personal box selection key which is used to select a personal box function. Here, the personal box function is the function to previously allocate plural virtual user areas to partial areas of the hard disk 600, enable to store and hold the job in regard to each user area (this user area is called a box, hereinafter), enable to cause the user to read the job from the box at his desired timing, and enable to print the read job and further transmit it to other apparatus. Incidentally, in this case, it is possible to previously prepare plural boxes (e.g., 100 boxes) in the hard disk 600, and set a name and a password in regard to each box. Moreover, it is possible to store the plural jobs in each box. If a personal box mode is selected and set by depressing the personal box selection key 505, the desired box is selected by the user from among the plural boxes through the operation unit 150, for example, an input process to store the job read by the reader unit 200 in the selected box is performed. Moreover, in the personal box mode, the desired job is selected by the user from among the plural jobs stored in the selected box through the operation unit 150, and the selected job is read from the hard disk 600. Then, for example, the selected and read job is printed by the printer unit 300, or transmitted to other apparatus through the network.

Incidentally, in the controller unit 110, it is possible to cause a touch panel (or a display panel) 516 of the operation unit 150 to display various user interface (UI) screens used to select the above functions, a later-described UI screen shown in FIG. 4, and the like. Moreover, display screen data and the like to be displayed on the UI screen of the operation unit 150 may be stored in, e.g., the hard disk 600 or other not-shown memory. That is, the present embodiment is applicable to any kinds of memory configurations. In this case, under the control of the controller unit 110, it is possible to read the display screen data from such a display memory and then display the read data on an appropriate display unit (including, e.g., the operation unit of the user's own apparatus, the operation unit of other remote apparatus, and the like).

Numeral 512 denotes a numeric key pad (also called a ten-key keypad hereinafter) which is used by the user to set the number of sheets to which the image forming should be performed, set the various modes, and input various numerals necessary in the operations. Moreover, the ten-key keypad 512 can be used to input, e.g., telephone numbers on a facsimile setting screen which is displayed in a case where a facsimile mode is selected and set by the user. Numeral 513 denotes a clear key which is used to disable the setting input by the user through the ten-key keypad 512, and numeral 508 denotes a reset key which is used to return the set number of sheets to which the image forming should be performed, the set operation modes, the selected sheet feed cassette, and the like, respectively to their default values.

Numeral 506 denotes a star key which is depressed to start an image forming operation such as a copy operation, and numeral 507 denotes a stop key which is depressed to stop the running image forming operation. Numeral 509 denotes a guide key which is depressed in a case where the user does not know how to execute a certain key function. That is, if the guide key 509 is depressed, the explanation of the key function in question is displayed on the display panel 516. Numeral 510 denotes a user mode key which is used to change the setting of the copying machine.

Moreover, numeral 511 denotes an interrupt key which is depressed in a case where the user wishes to perform other operation during the image forming operation, and numeral 514 denotes a set of 20 one-touch dial keys which is used in a case where one-touch dialing is performed in the facsimile transmission.

In response to the various user's operations using the above keys on the operation unit 150, the controller unit 110 controls each unit to perform the operations according to the instructions based on the contents of user's operations.

Numeral 515 denotes a set of two covers which has a double structure. Here, on each cover, the portions corresponding to the respective one-touch dial keys 514 are hollowed out. Besides, the set of the two covers 515 provides three states, that is, a first state that both the two covers are closed, a second state that only the first cover is closed, and a third state that only the second cover is closed, which are all detected by a not-shown sensor switch. In other words, the set of the two covers 515 according to the present embodiment brings about the effect which is equivalent to that in a case where 60 different kinds of keys are totally prepared. Typically, the above-described keys are respectively provided as hard keys, but other appropriate keys may be provided as soft keys of the UI screen to be displayed on the touch panel 516.

Moreover, numeral 516 denotes the touch panel on which the setting screen is displayed in regard to each mode. That is, on the touch panel 516, the various detailed setting can be achieved by appropriately touching drawn and displayed keys.

Figure 4:
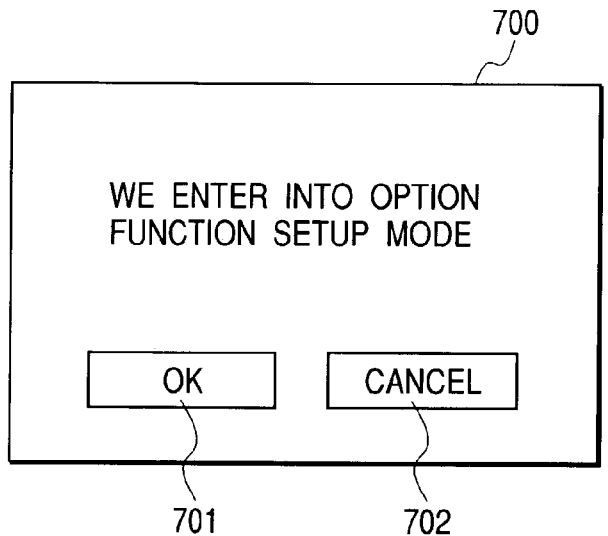
FIG. 4 is a typical view showing an option function setup mode screen which is displayed on a touch panel of the operation unit shown in FIG. 3 so as to cause the image forming apparatus according to the present invention to operate in an option function setup mode.

FIG. 4 is the typical view showing an example of an option function setup mode screen which is displayed on the touch panel 516 of the operation unit 150 shown in FIG. 3 so as to cause the image forming apparatus according to the present invention to operate in an option function setup mode.

In FIG. 4, numeral 700 denotes an option function setup mode screen. When the user specifically combines and depresses the numeric keys of the ten-key keypad 512, the user mode key 510 and the guide key 509, the option function setup mode screen 700 is displayed in response to such depressions under the control of the controller unit 110.

Then, when an "OK" key 701 is depressed by the user, it is possible in response to such a depression to cause the image forming apparatus to operate in the option function setup mode under the control of the controller unit 110. In the option function setup mode, it is possible to rewrite the contents of data communication to set up the option function from an external apparatus (e.g., a host computer, or another image forming apparatus) connected through a communication medium (e.g., a network) and also to rewrite the value of an option function flag stored in the nonvolatile memory (e.g., a not-shown EEPROM (Electronically Erasable and Programmable Read Only Memory) provided in the controller unit 110 of FIG. 1) of the image forming apparatus.

Incidentally, the option function of the image forming apparatus includes, e.g., (1) a security function, (2) a network scanner function, (3) a cooperation function associated with document administration software, and the like. In this way, although a case where the plural kinds of option functions can be set for one image forming apparatus will be mainly explained in the present embodiment, the present invention is of course applicable to a case where only one kind of option function can be set for one image forming apparatus. Moreover, in addition to the above option functions, any kind of option function which is applicable to the apparatus or the system according to the present embodiment may be included in the present invention.

In the present embodiment, the operations for instructing to validate and invalidate the option function are limited. More specifically, the setting operation to validate the option function which has been set (or is set) to the image forming apparatus (i.e., the setting operation to permit the image forming apparatus to perform the process concerning the option function in question), the setting operation to invalidate the option function (i.e., the setting operation to inhibit the image forming apparatus from performing the process using the option function in question), and the like are limited. Moreover, in the present embodiment, it is possible to control whether or not to enable the setting operation for instructing to validate and invalidate the option function, on the basis of the later-described various processes.

Numeral 702 denotes a "CANCEL" key. When the "CANCEL" key 702 is depressed, the controller unit 110 ends the option function setup mode and further closes the option function setup mode screen 700.

Figure 5:
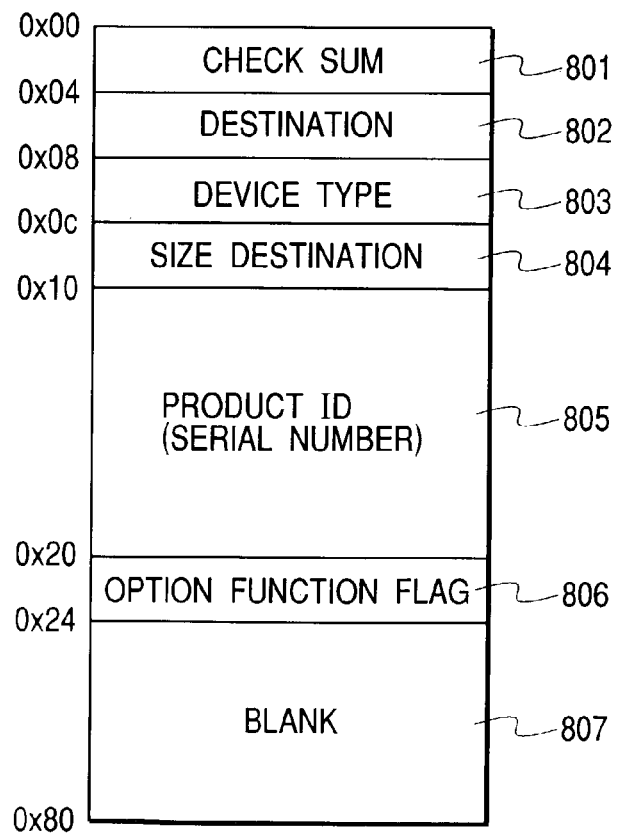
FIG. 5 is a typical view showing an example of a memory map of a nonvolatile memory provided in the image forming apparatus according to the present invention.

FIG. 5 is a typical view showing an example of a memory map of the nonvolatile memory provided in the image forming apparatus according to the present invention. Here, in the present embodiment, the various data shown in FIG. 5 are stored in the memory provided in the image forming apparatus. However, a memory which stores the data shown in FIG. 5 may be provided in another apparatus such as a server, a computer or the like, so that the stored data can be appropriately accessed under the control of the controller unit 110.

The nonvolatile memory shown in FIG. 5 (provided in the controller unit 110 shown in FIG. 1) has the size of 128 bytes, and the option function flag according to the present embodiment is stored in this memory. In FIG. 5, numeral 801 denotes a check sum area in which a check sum value of four bytes for the nonvolatile memory is stored. Numeral 802 denotes a destination area in which OEM (original equipment manufacturer) information of four bytes is stored. Numeral 803 denotes a device type area in which printer performance information of the image forming apparatus in question is stored as a value of four bytes. For example, the printer performance information includes information representing whether or not the image forming apparatus in question is a type capable of performing color printing, information representing whether or not the image forming apparatus in question is a type of performing black-and-white printing, performance information representing how many sheets the image forming apparatus in question can perform printing a minute, information representing whether or not the image forming apparatus in question has a double-sided printing function, information representing whether or not the image forming apparatus in question has a stapling function, and the like. Numeral 804 denotes a size destination area in which a four-byte flag representing a recording sheet size system (including, e.g., an AB system, an inch system, an A system, and the like).

Numeral 805 denotes a product ID area in which inherent information of the image forming apparatus in question is stored. More specifically, a 32-byte product ID (i.e., a serial number) which is different in regard to each image forming apparatus is stored in the product ID area 805. In other words, when there are plural image forming apparatuses, the product ID of each image forming apparatus is made different from others. Numeral 806 denotes an option function flag area in which the option function flag is stored. Here, it should be noted that the option function flag is the flag to indicate which of the option functions of the image forming apparatus has been validated or invalidated. Finally, numeral 807 denotes a blank (unused) area.

Here, it is assumed that that, at present, (1) the security function, (2) the network scanner function, and (3) the cooperation function associated with the document administration software are newly set to the image forming apparatus in question. In such a state, the information representing validation and invalidation is stored and administrated in regard to each function. More concretely, for example, each of the information representing that the function (1) is invalidated (i.e., use of this function is inhibited), the information representing that the function (2) is validated (i.e., use of this function is permitted), and the information representing that the function (3) is invalidated (i.e., use of this function is inhibited) is independently stored and administrated. The information stored in the option function flag area 806 is controlled to be written by the controller unit 110 under a predetermined condition, through the processes in the later-described flow chart or the like. Incidentally, it should be noted that the option functions will be later explained in detail.

Figure 6:
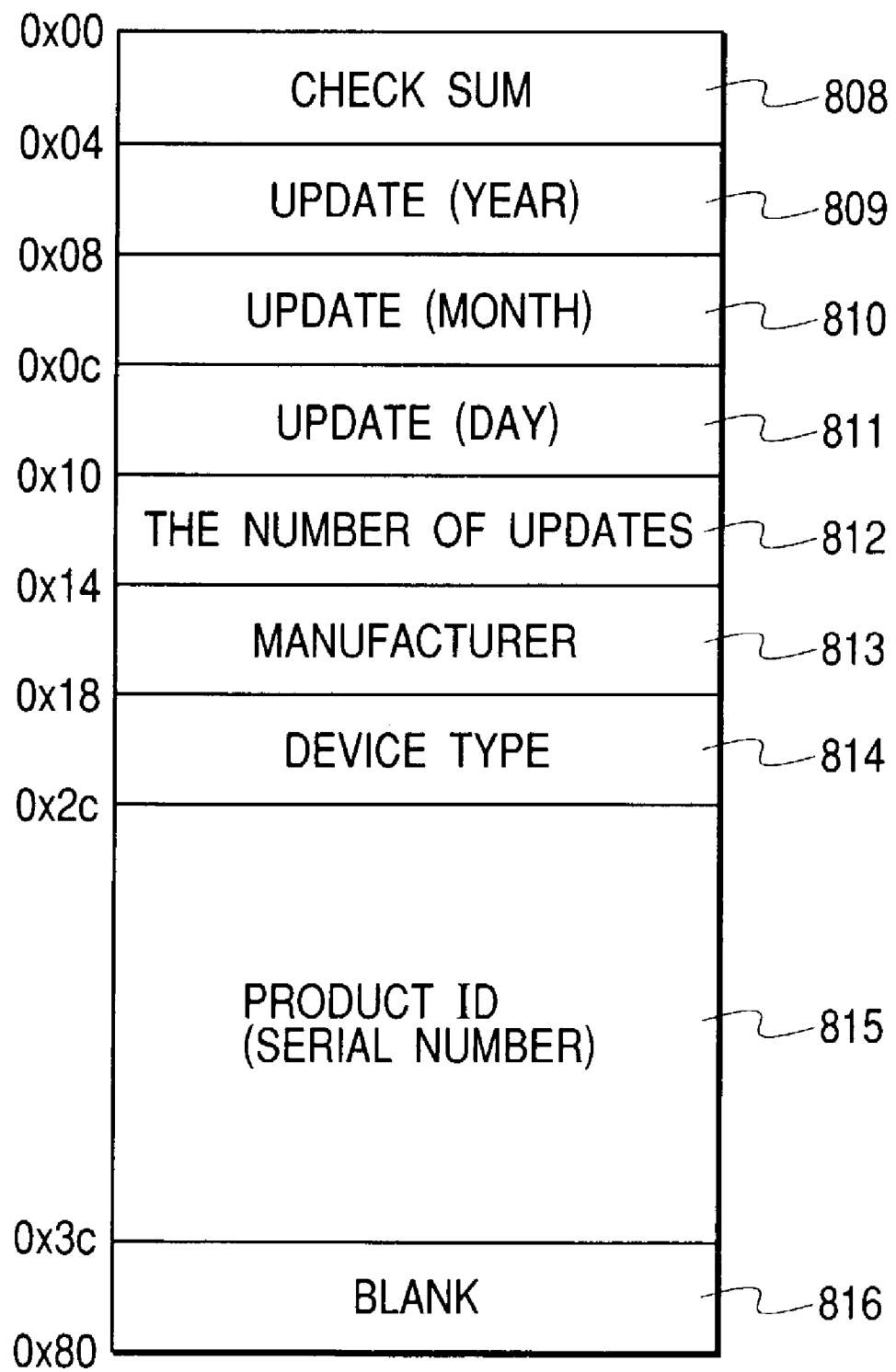
FIG. 6 is a typical view showing an example of the format of an ID file stored in an external storage medium such as a not-shown hard disk or the like connected to an external apparatus according to the present invention.

FIG. 6 is a typical view showing an example of the format of an ID file stored in an external storage medium such as a not-shown hard disk or the like connected to the external apparatus according to the present invention.

In the present embodiment, the case where the various data shown in FIG. 6 are stored in the external apparatus such as the host computer or the like will be mainly explained by way of example. However, such the data may be stored in another external apparatus such as another image forming apparatus or the like.

In FIG. 6, numeral 808 denotes a check sum area in which a check sum value of four bytes for the ID file is stored. Numeral 809 denotes an update (year) area in which an ID file generation year is stored as four-byte data, numeral 810 denotes an update (month) area in which an ID file generation month is stored as four-byte data, and numeral 811 denotes an update (date) area in which an ID file generation date is stored as four-byte data.

Moreover, numeral 812 denotes an update number area in which information (i.e., a value) representing how many times the ID file is updated is stored as four-byte data, numeral 813 denotes a manufacturer area in which information (i.e., a value) representing a manufacturer is stored, and numeral 814 denotes a device type area in which printer performance information of the image forming apparatus in question is stored as a value of four bytes. Numeral 815 denotes a product ID area in which an ID unique to the image forming apparatus is stored. Here, the stored ID is an image forming apparatus ID which is compared, in an ID comparison unit, with the product ID stored in the product ID area 805 of the nonvolatile memory. Finally, numeral 816 denotes a blank (unused) area.

That is, the data which is stored in the memory shown in FIG. 6 set in the external apparatus is administration control information which is valid only to the above one image forming apparatus owned by the user (i.e., the user of the external apparatus).

Here, it is assumed that the ID file is administrated according to a serial number of a setup program and only one ID file is stored in regard to one setup program. Thus, if the setup program is illegally or unfairly duplicated, since the original setup program is identical with the illegally duplicated setup program, the ID file of this program is shared by the user of the original setup program and the user of the duplicated setup program. In such a case, as shown in the later-described flow charts of FIGS. 7A and 7B and FIGS. 13A and 13B, it is controlled that the option function cannot be set up for the plural image forming apparatuses by the illegally duplicated plural setup programs.

By doing so, it is prevented in the present embodiment that the setup program of the image forming apparatus is illegally used. That is, the present embodiment inhibits the user from performing the setup operation of the option function to the plural image forming apparatuses by using one setup program. For example, it inhibits the user from illegally duplicating or copying one predetermined setup program and using the duplicated program to perform the setup operation. In other words, in a case of corresponding to the condition that the plural setup programs are illegally obtained, it is controlled according to the later-described comparison result of the product ID that the setup operation of the option function to the plural image forming apparatuses is inhibited. On one hand, the present embodiment permits the user to perform the setup operation of the option function to only one image forming apparatus by using one setup program.

Incidentally, in a case where the user rightly bought plural sets of setup programs, the ID file is created to each of the programs, and each ID file is administrated according to the serial number of each setup program, whereby the option functions can be set up respectively to the plural image forming apparatuses.

That is, it permits the user who rightly obtained the plural setup programs by paying a fair price to perform the setup operation of the option function to the plural image forming apparatuses corresponding to these programs. As above, according to the present embodiment, in case of corresponding to the condition that the plural setup programs are fairly obtained, it is controlled according to the later-described comparison result of the product ID that the setup operation of the option function to the plural image forming apparatuses is permitted.

Moreover, it is assumed that the ID file is encrypted and then stored, whereby it is possible, for example, to prevent a user from tempering with the ID file.

Moreover, it is assumed that the ID file is stored, with a name which cannot be easily understood by users (i.e., a name which is quite irrelevant to a program name), at the location different from that where the program file is stored, whereby it is possible, for example, to prevent a user from tempering with and deleting the ID file more strongly.

Incidentally, it should be noted that the external storage medium such as the not-shown hard disk or the like which stores the ID file shown in FIG. 6 and is connected to the external apparatus may be connected to an external terminal of the external apparatus or to an internal bus thereof. In other words, the above external storage medium may be an integrated-type storage medium or a separated-type storage medium.

Hereinafter, an option function setup processing procedure in the system to which the information processing apparatus and the image forming apparatus according to the first embodiment of the present invention are applicable will be explained with reference to flow charts shown in FIGS. 7A and 7B.

Figure 7A:
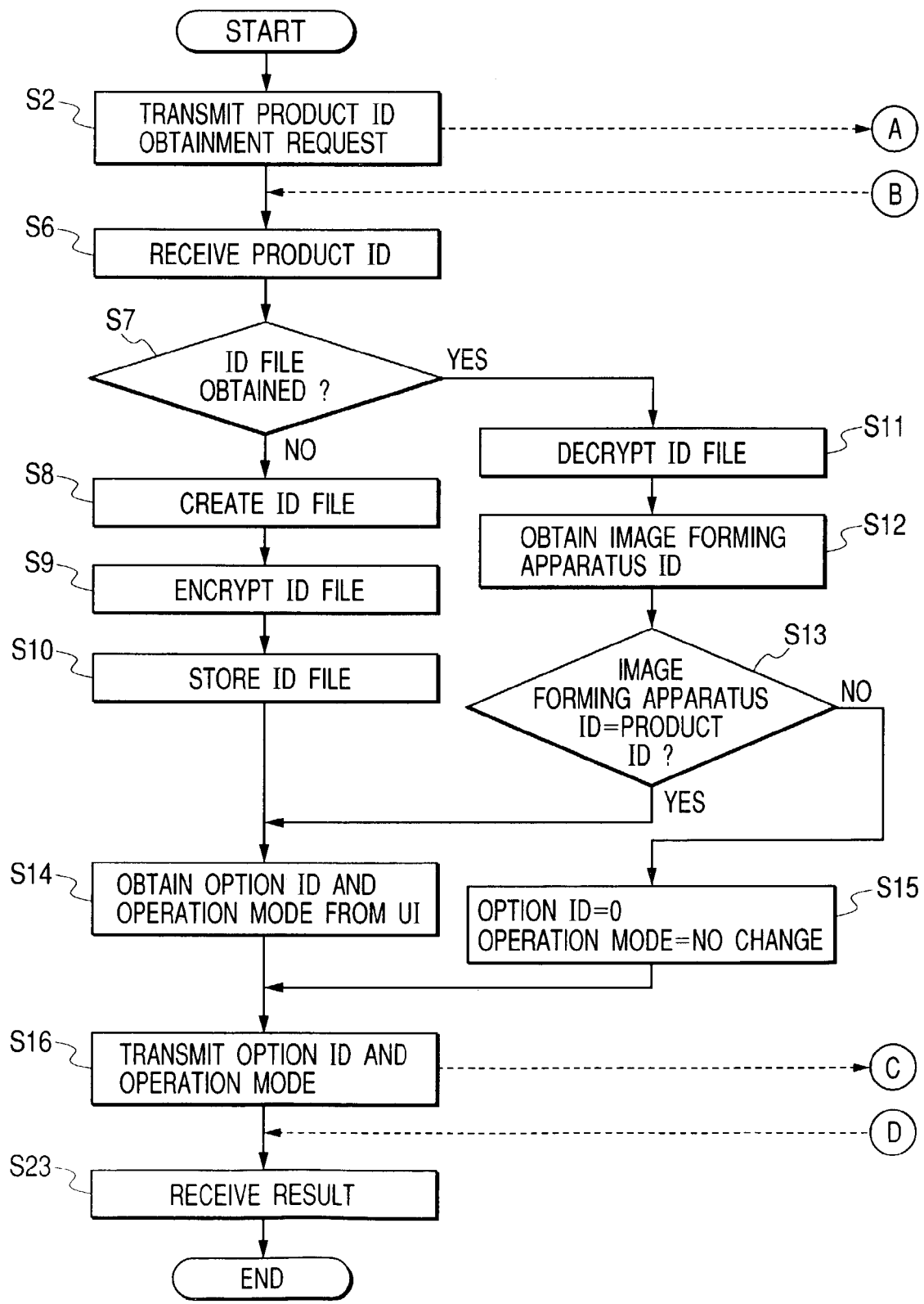
FIGS. 7A and 7B are flow charts showing an example of an option function setup processing procedure in the system to which the information processing apparatus and the image forming apparatus according to the first embodiment of the present invention are applicable.
Figure 7B:
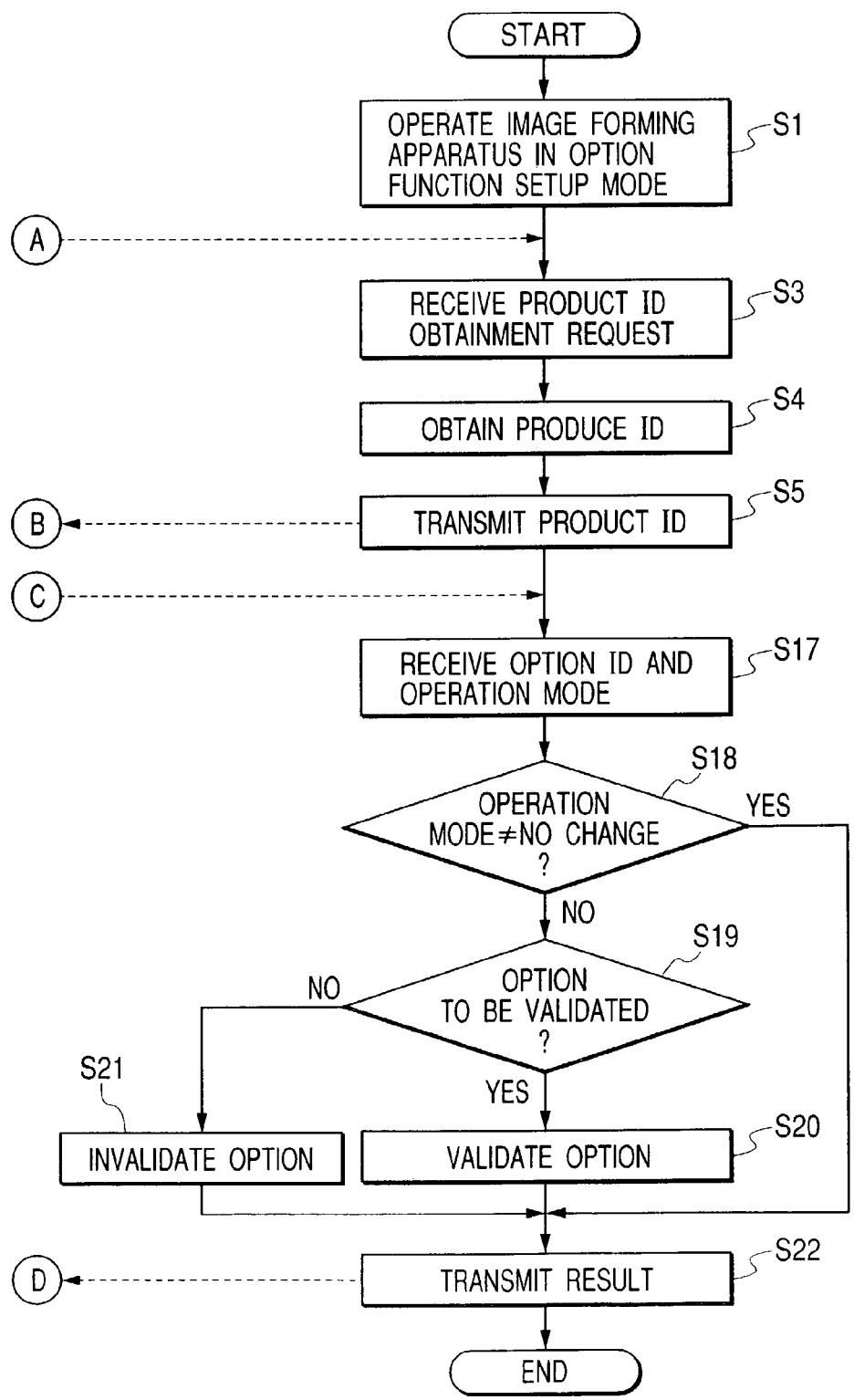

That is, FIGS. 7A and 7B are the flow charts showing the example of the option function setup processing procedure in the system to which the information processing apparatus and the image forming apparatus according to the first embodiment of the present invention are applicable. More specifically, FIG. 7A shows the process on the external apparatus side which is performed by not-shown CPU's in the PC's 401 and 402 of FIG. 1 based on a program stored in the ROM, the hard disk or other storage medium, FIG. 7B shows the process on the image forming apparatus side which is performed by a not-shown CPU in the controller unit 110 of FIG. 1 based on a program stored in the ROM, the hard disk 600 or other storage medium, and symbols S1 to S23 shown in FIGS. 7A and 7B respectively denote the steps which are to be performed in the option function setup processing procedure. Incidentally, the feature of the present embodiment is to perform ID comparison on the external apparatus side.

First, in a step S1, on the image forming apparatus side, the "OK" key 701 on the option function setup mode screen 700 shown in FIG. 4 is depressed to cause the image forming apparatus to operate in the option function setup mode.

In such a state, an image forming apparatus option function setup tool is activated by the user on the external apparatus, and the external apparatus and the image forming apparatus are connected to each other through the communication medium such as the LAN 400 or the like so that the external apparatus and the image forming apparatus can be mutually communicated with each other. After then, in a step S2, on the external apparatus side, a product ID obtainment request for obtaining the product ID is transmitted to the image forming apparatus through the communication medium.

Then, in a step S3, the product ID obtainment request transmitted from the external apparatus is received by the image forming apparatus through the communication medium. Further, in a step S4, the product ID which has been stored in the product ID area 805 of the nonvolatile memory (this memory is provided on the image forming apparatus side) shown in FIG. 5 is read. Then, in a step S5, the product ID stored in the product ID area 805 is transmitted from the image forming apparatus to the external apparatus through the communication medium in response to the product ID obtainment request command by the external apparatus (at this time, also the printer performance information of the image forming apparatus stored in the device type area 803 is transmitted to the external apparatus).

After that, in a step S6, the product ID transmitted from the image forming apparatus is received by the external apparatus through the communication medium, and then it is judged in a step S7 whether or not the ID file can be read (or obtained) from the not-shown external storage medium (i.e., the memory in which the data shown in FIG. 6 have been stored) connected to the external apparatus. If the ID file cannot be read (or obtained) from the external storage medium (due to damage of the ID file, or no existence of the ID file), the flow advances to a step S8 to create or generate the ID file. Then, in a step S9, the created ID file is encrypted by the external apparatus. Here, it should be noted that the encryption of the ID file may be performed in any method. After then, in a step S10, the encrypted ID file is stored in the external storage medium by the external apparatus, and the flow advances to a step S14.

On the other hand, if it is judged in the step S7 that the ID file can be read (or obtained) from the external storage medium, then, in a step S11, the ID file is read and decrypted by the external apparatus. Subsequently, on the external apparatus side, in a step S12, the image forming apparatus ID (i.e., the product ID stored in the product ID area 815) is read from the decrypted ID file (i.e., the data shown in FIG. 6), and, in a step S13, the read product ID is compared with the product ID received from the image forming apparatus side in the step S6. Here, if it is judged that the product ID obtained from the image forming apparatus coincides with the image forming apparatus ID stored in the external storage medium, the flow advances to the step S14. In the step S14, an option ID and an operation mode input by the user through an option operation screen displayed on a not-shown display of the external apparatus are obtained, and the flow advances to a step S16. Here, it should be noted that the option ID is the ID which is to discriminate the option function of the image forming apparatus, and the operation mode is the mode in which the operation to validate, to invalidate or not to change the option function corresponding to the selected option ID is performed.

For example, in the case where the security function, the network scanner function, and the cooperation function associated with the document administration software are set as the option functions of the image forming apparatus, the option ID is previously given to each of these functions. Then, "no change" is set to the security function corresponding to an option ID (1), "validation" is set to the network scanner function corresponding to an option ID (2), and "invalidation" is set to the cooperation function associated with the document administration software corresponding to an option ID (3), by the user through the option operation screen displayed on the external apparatus. Thus, the control information in regard to each of these functions is obtained in response to the setting by the user.

On the other hand, if it is judged in the step S13 that the product ID obtained from the image forming apparatus does not coincide with the image forming apparatus ID stored in the external storage medium, the flow advances to the step S15. In the step S15, the option ID is set to "0" and the operation mode is automatically set to "no change," and the flow further advances to the step S16.

Then, in the step S16, the option ID and the operation mode which are obtained in the step S14 based on the setting from the user or automatically determined in the step S15 after the result "NO" in the step S13 are transmitted from the external apparatus to the image forming apparatus through the communication medium. Here, it should be noted that the option ID and the operation mode are transmitted in the state distinguishable in regard to each function.

By doing so, in a step S17, the option ID and the operation mode which are transmitted from the external apparatus are received by the image forming apparatus through the communication medium. Next, in a step S18, it is judged by the image forming apparatus whether or not the received operation mode has been set to "no change." Here, if it is judged that the received operation mode has been set to "no change," the option function flag corresponding to the option ID in the data shown in FIG. 5 is not rewritten as is, and the flow then advances to a step S22. On the other hand, if it is judged in the step S18 that the received operation mode has been set to "change" (i.e., not "no change"), the flow advances to a step S19 to further judge whether or not the operation mode has been set to "validation" (i.e., whether or not the option function is to be validated).

Then, if it is judged in the step S19 that the operation mode has been set to "validation," the flow advances to a step S20. Here, on the memory map shown in FIG. 5, the data of the option function flag area 806 corresponding to the received option ID is rewritten into "1" by the image forming apparatus to validate the option function so that the image forming apparatus can execute the option function in question. Then, the flow advances to the step S22.

Therefore, for example, if the option function which has been validated by rewriting the data of the option function flag area 806 from "0" into "1" is the network scanner function, it is controlled that the network scanner function can be used by the user in the image forming apparatus until the data value of the option function flag area is rewritten in the future.

On the other hand, if it is judged in the step S19 that the operation mode has been set to "invalidation," the flow advances to a step S21. Here, on the memory map shown in FIG. 5, the data of the option function flag area 806 corresponding to the received option ID is rewritten into "0" by the image forming apparatus to invalidate the option function so that the image forming apparatus cannot execute the option function in question. Then, the flow advances to the step S22.

Therefore, for example, if the option function which has been validated by rewriting the data of the option function flag area 806 from "1" into "0" is the cooperation function associated with the document administration software, it is controlled that a use of the cooperation function associated with the document administration software is inhibited in the image forming apparatus until the data value of the option function flag area is rewritten in the future.

Finally, in the step S22, a setting result of the option function flag (i.e., "writing ends in success," "writing ends in failure," or "no writing") is transmitted from the image forming apparatus to the external apparatus through the communication medium, and the process on the image forming apparatus side ends.

Then, in a step S23, the setting result transmitted from the image forming apparatus is received by the external apparatus through the communication medium and notified to the user through the display or the like of the external apparatus in question, and the process on the external apparatus side ends.

As explained above, only in the case where the image forming apparatus ID of the ID file stored in the external storage medium of the external apparatus coincides with the product ID stored in the nonvolatile memory of the image forming apparatus or in the case where the ID file does not exist, the option function can be set up from the external apparatus in question. Thus circumstanced, even if the user (i.e., malicious user) illegally duplicates the setup program with an evil intention, since the illegally duplicated plural setup programs are the identical program to which only the identical (or unique) ID file is used, he can merely set up the option function only for one image forming apparatus.

In other words, the program data of FIG. 6 including the product ID area 815 is the product ID corresponding to the product ID area 815, and it is controlled to be able to set validation and invalidation of the option function only for the image forming apparatus which is administrated based on the data shown in FIG. 5 including the product ID area 805.

Then, it is controlled that the program data of FIG. 6 including the product ID area 815 comes to be invalidated in regard to the image forming apparatuses other than the image forming apparatus in question which is administrated based on the data shown in FIG. 5 including the product ID area 805. Therefore, for example, even if the data showing in FIG. 6 including the product ID area 815 is used, it is controlled not to be able to set validation and invalidation of the option function in regard to the image forming apparatuses other than the image forming apparatus in question in the system to which the information processing apparatus and the image forming apparatus according to the present embodiment are applicable.

Therefore, it is possible to prevent the conventional problem that, if the user who owns only one setup program illegally duplicates it with the evil intention, the option function can be validated for the plural image forming apparatuses. Moreover, since the ID comparison process is performed on the external apparatus side, it is unnecessary to change the programs on the plural image forming apparatus sides even if the ID comparison method is changed, whereby there is a significant effect of improving the correction operation in the option function setup procedure.

Incidentally, as the option functions of the image forming apparatus, there are (1) the security function, (2) the network scanner function, (3) the cooperation function associated with the document administration software, and the like. Here, it should be noted that the option functions which can be set according to the present invention are not limited to the above functions (1) to (3).

Hereinafter, each option function will be explained.

(1) Security Function
    The function to inhibit from displaying the history of the job which has been input to the image forming apparatus
    The function to overwrite, in a case where the image data which has been scanned by the reader unit of the image forming apparatus and then stored in the hard disk of the image forming apparatus becomes useless, the image data in question by random data (2) Network Scanner Function
    The function to control, from the external apparatus which is connected to the image forming apparatus through the network, the scanner function of the image forming apparatus and store the image data obtained due to the scanner function in the hard disk of the external apparatus (3) Cooperation Function Associated With Document Administration Software
    The function to enable document administration software, which is running on the external apparatus connected to the image forming apparatus through the network, to administrate the image data which has been stored in the hard disk of the image forming apparatus Hereinafter, the setup operation procedure of (1) the security function will be explained with reference to FIGS. 8 to 12.

FIGS. 8 to 12 are typical views showing an example of a security option function setup operation screen in an image forming apparatus option function setup tool which is activated on the external apparatus according to the present invention, and the security option function setup operation screen is displayed on the not-shown monitor of the PC 401 or 402 shown in FIG. 1.

Figure 8:
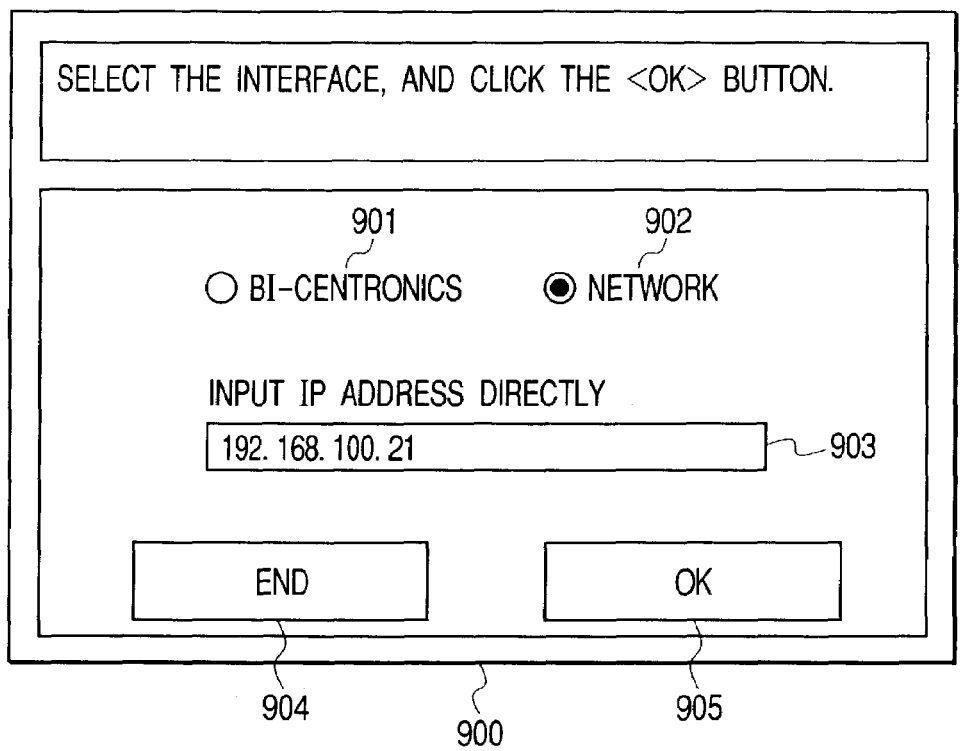
FIG. 8 is a typical view showing an example of a security option function setup operation screen in an image forming apparatus option function setup tool activated on the external apparatus according to the present invention.

That is, on the image forming apparatus side, the "OK" key 701 on the option function setup mode screen 700 shown in FIG. 4 is depressed to cause the image forming apparatus to operate in the option function setup mode (corresponding to the process in the step S1 of FIG. 7B), and the image forming apparatus option function (security) setup tool is activated on the external apparatus. By such operations, an operation screen 900 shown in FIG. 8 is displayed on the monitor of the external apparatus.

Here, as shown in FIG. 1, since the system according to the present invention consists of the external apparatus and the image forming apparatus which are connected to each other through the LAN 400, a check box "NETWORK" 902 is selected by a not-shown pointing device of the external apparatus, and an IP address of the image forming apparatus is input in an input area 903 by using a not-shown keyboard of the external apparatus. On the other hand, if the system according to the present invention adopts parallel connection, a check box "BI-CENTRONICS" 901 is selected.

Figure 9:
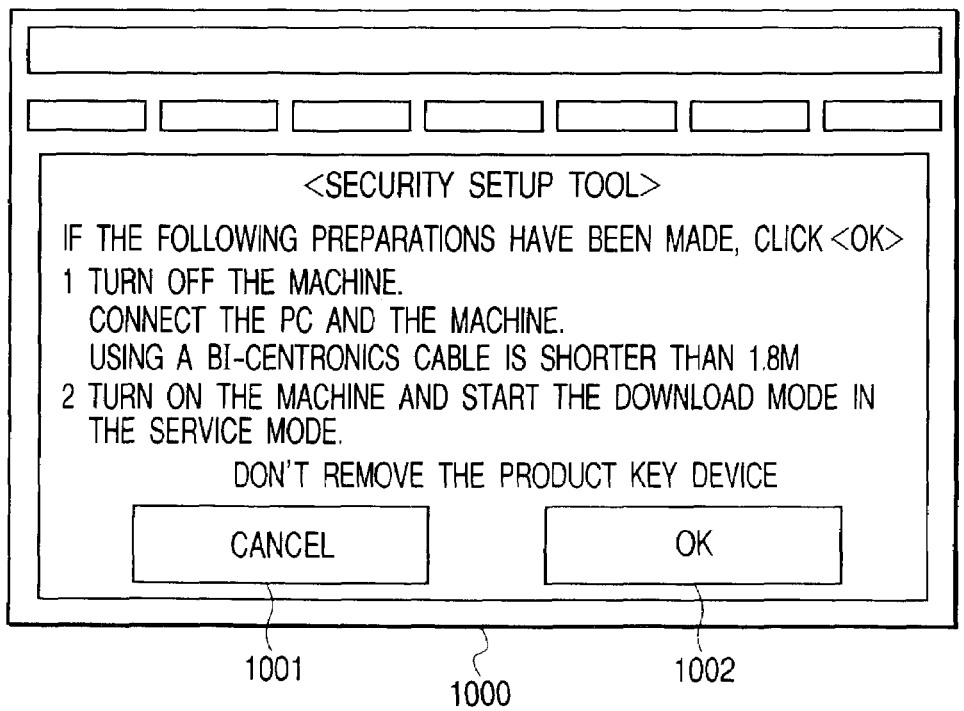
FIG. 9 is a typical view showing an example of the security option function setup operation screen in the image forming apparatus option function setup tool activated on the external apparatus according to the present invention.

Then, when an "OK" key 905 is clicked on the operation screen 900, an operation screen 1000 shown in FIG. 9 is displayed on the monitor of the external apparatus. On the other hand, when an "END" key 904 is clicked, the image forming apparatus option function (security) setup tool ends.

Here, as described above, since the external apparatus and the image forming apparatus are connected to each other through the LAN 400 and the image forming apparatus has already entered into the option function setup mode, an "OK" key 1002 is clicked as it is on the operation screen 1000 shown in FIG. 9. On one hand, when a "CANCEL" key 1001 is clicked, the image forming apparatus option function (security) setup tool ends.

Incidentally, when the external apparatus and the image forming apparatus are not connected to each other, a parallel cable connection operation is performed according to the following procedures 1 and 2 which are displayed on the operation screen 1000.

That is, in the procedure 1, the power source of the image forming apparatus is turned off, and the external apparatus and the image forming apparatus are connected to each other through the Centronics parallel cable.

Then, in the procedure 2, the power source of the image forming apparatus is again turned on, and the "OK" key 1002 is clicked.

Figure 10:
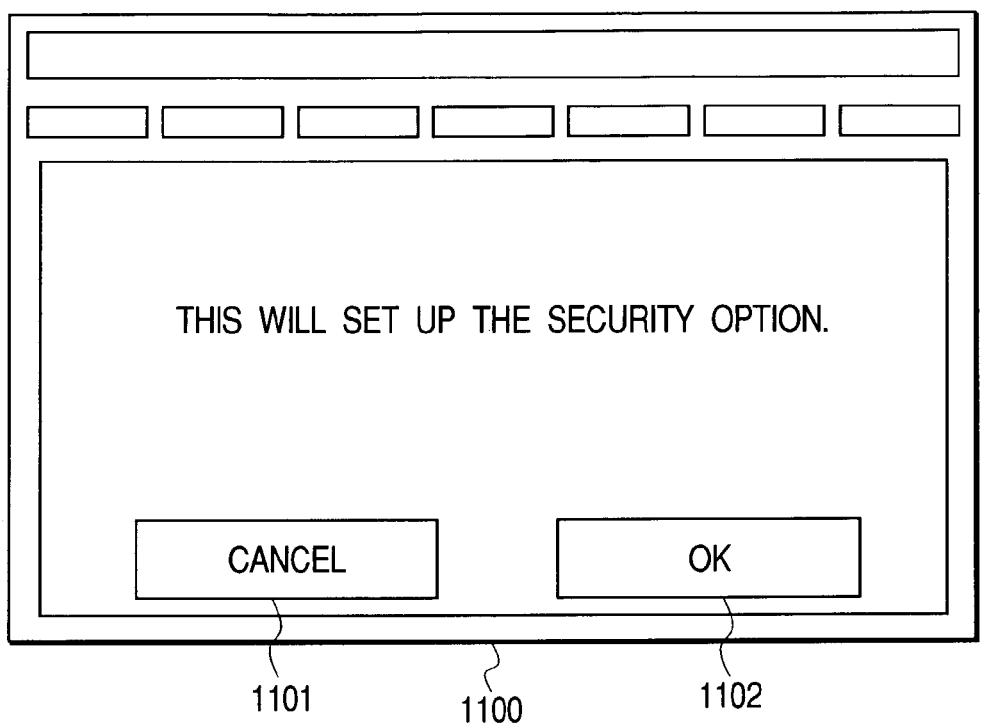
FIG. 10 is a typical view showing an example of the security option function setup operation screen in the image forming apparatus option function setup tool activated on the external apparatus according to the present invention.

Incidentally, an operation screen 1100 shown in FIG. 10 is displayed on the monitor of the external apparatus, for example, in the case where the "OK" key 1002 is clicked on the operation screen 1000 shown in FIG. 9, the processes in the steps S2 to S13 shown in FIG. 7A are performed, and the image forming apparatus ID coincides with the product ID.

When an "OK" key 1102 is clicked on the operation screen 1100, the security option function is validated, while when a "CANCEL" key 1101 is clicked, the security option function is invalidated.

Incidentally, when the "OK" key 1102 or the "CANCEL" key 1101 is clicked on the operation screen 1100 shown in FIG. 10, the option ID corresponding to the security option and the information representing which of the "OK" key 1102 and the "CANCEL" key 1101 is clicked are obtained by the external apparatus (corresponding to the step S14 in FIG. 7A), and the option ID and the operation mode are then transmitted to the image forming apparatus (corresponding to the step S16 in FIG. 7A). Hereinafter, the explanation continues on the premise that the "OK" key 1102 is clicked.

Figure 11:
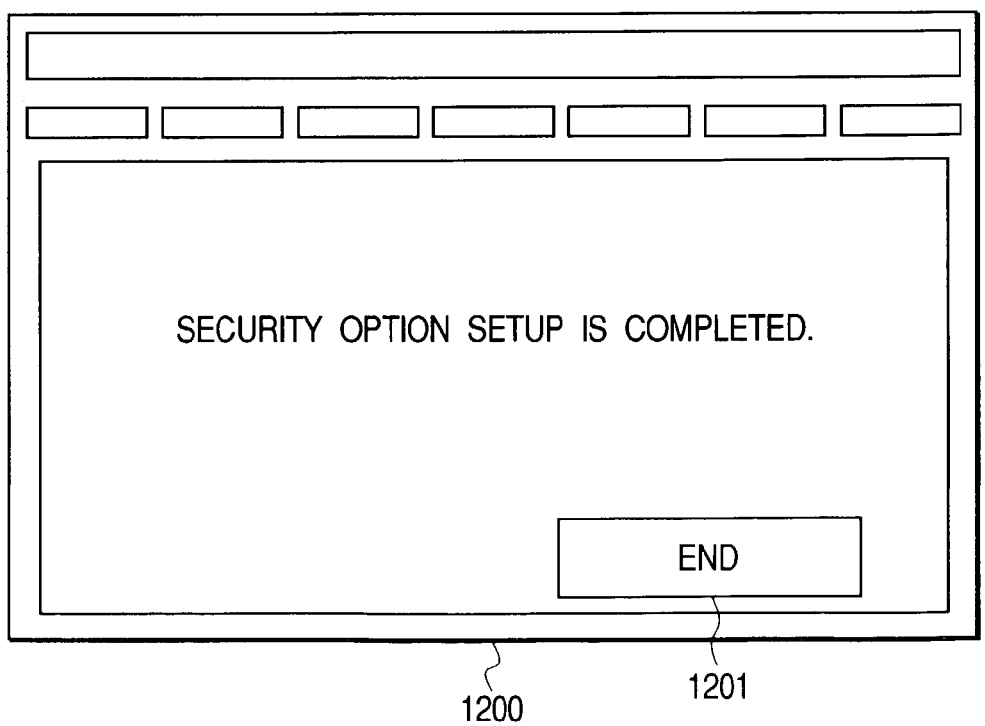
FIG. 11 is a typical view showing an example of the security option function setup operation screen in the image forming apparatus option function setup tool activated on the external apparatus according to the present invention.

Then, the processes in the steps S17 to S22 shown in FIG. 7B are performed on the image forming apparatus side, and an operation screen 1200 shown in FIG. 11 is displayed on the monitor of the external apparatus when the option function flag setting result (it is assumed to "writing ends in success" in this case) transmitted from the image forming apparatus is received by the external apparatus (corresponding to the step S23 shown in FIG. 7A).

Figure 12:
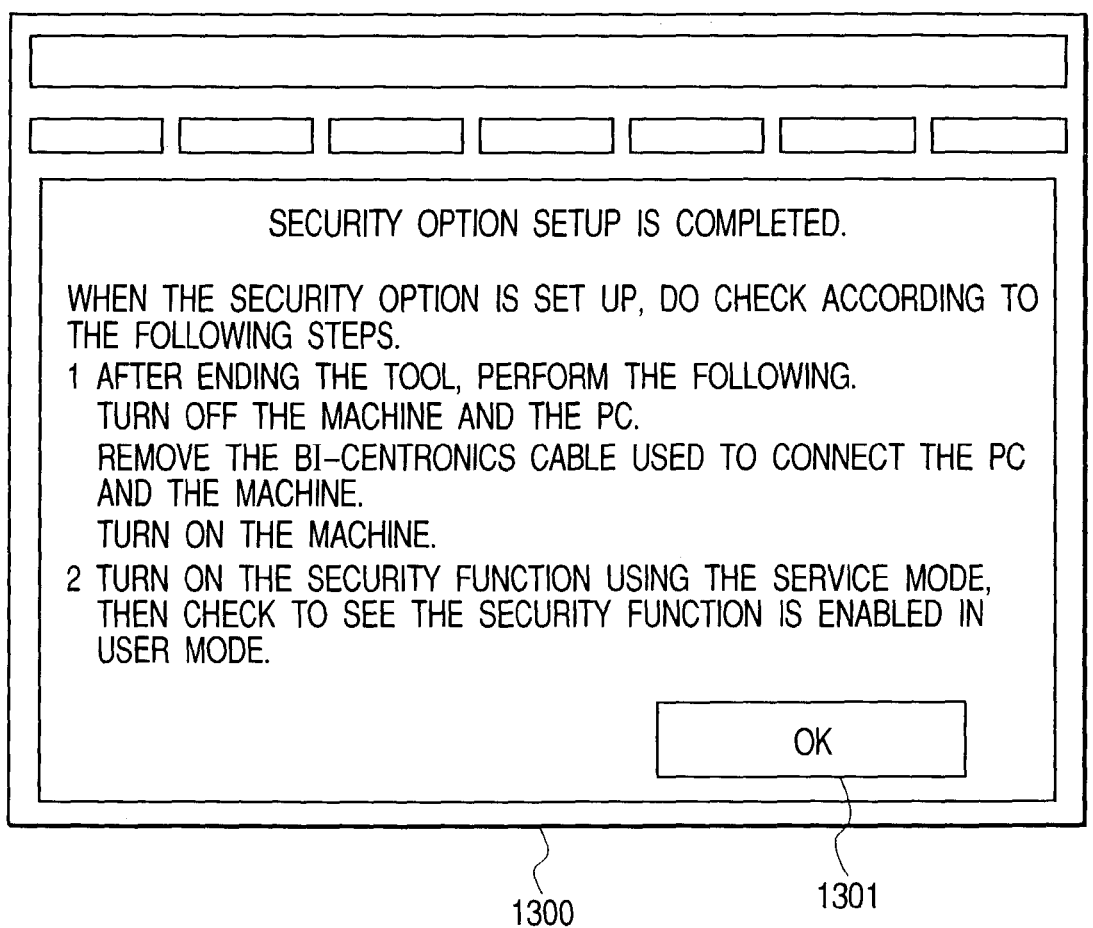
FIG. 12 is a typical view showing an example of the security option function setup operation screen in the image forming apparatus option function setup tool activated on the external apparatus according to the present invention.

After then, when an "END" key 1201 is clicked on the operation screen 1200 shown in FIG. 11, an operation screen 1300 shown in FIG. 12 is displayed on the monitor of the external apparatus.

At the last, the setting state of the security option is confirmed according to the following procedures 1 and 2 which are displayed on the operation screen 1300 shown in FIG. 12.

That is, in the procedure 1, the power source of the image forming apparatus is once turned off, and then this power source is again turned on (after the cable is removed when the external apparatus and the image forming apparatus are connected to each other through the Centronics parallel cable).

Then, in the procedure 2, it enters the image forming apparatus into a service mode to confirm that the security option has been validated in the user mode. If it is confirmed that the security option has been validated in the user mode, the service mode of the image forming apparatus ends.

Subsequently, if an "OK" key 1301 is clicked on the operation screen 1300 displayed on the monitor of the external apparatus, the setup tool ends.

Second Embodiment

In the above first embodiment, the case of performing the ID comparison on the external apparatus side is explained. However, it is possible to perform the ID comparison on the image forming apparatus side. Hereinafter, the second embodiment of the present invention in which the ID comparison is performed on the image forming apparatus side will be explained.

In the present embodiment, it is assumed that the entire structures of an image input/output apparatus, an option function setup mode screen, a nonvolatile memory storing a product ID, an ID file and the like are substantially the same as those in the above first embodiment.

Hereinafter, an option function setup processing procedure in a system to which an information processing apparatus and an image forming apparatus according to the second embodiment of the present invention are applicable will be explained with reference to flow charts shown in FIGS. 13A and 13B.

Figure 13A:
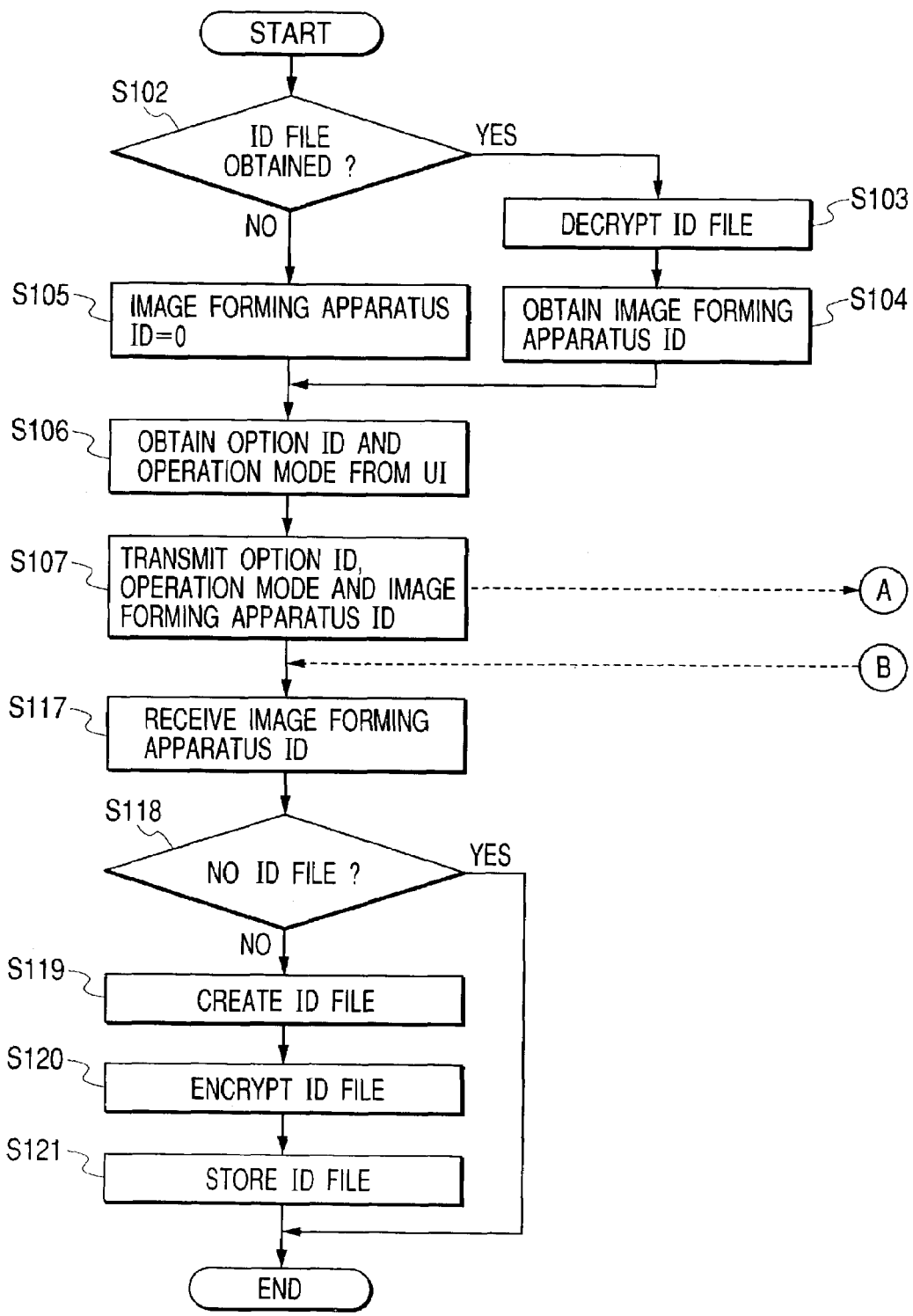
FIGS. 13A and 13B are flow charts showing an example of an option function setup processing procedure in a system to which an information processing apparatus and an image forming apparatus both according to the second embodiment of the present invention are applicable.
Figure 13B:
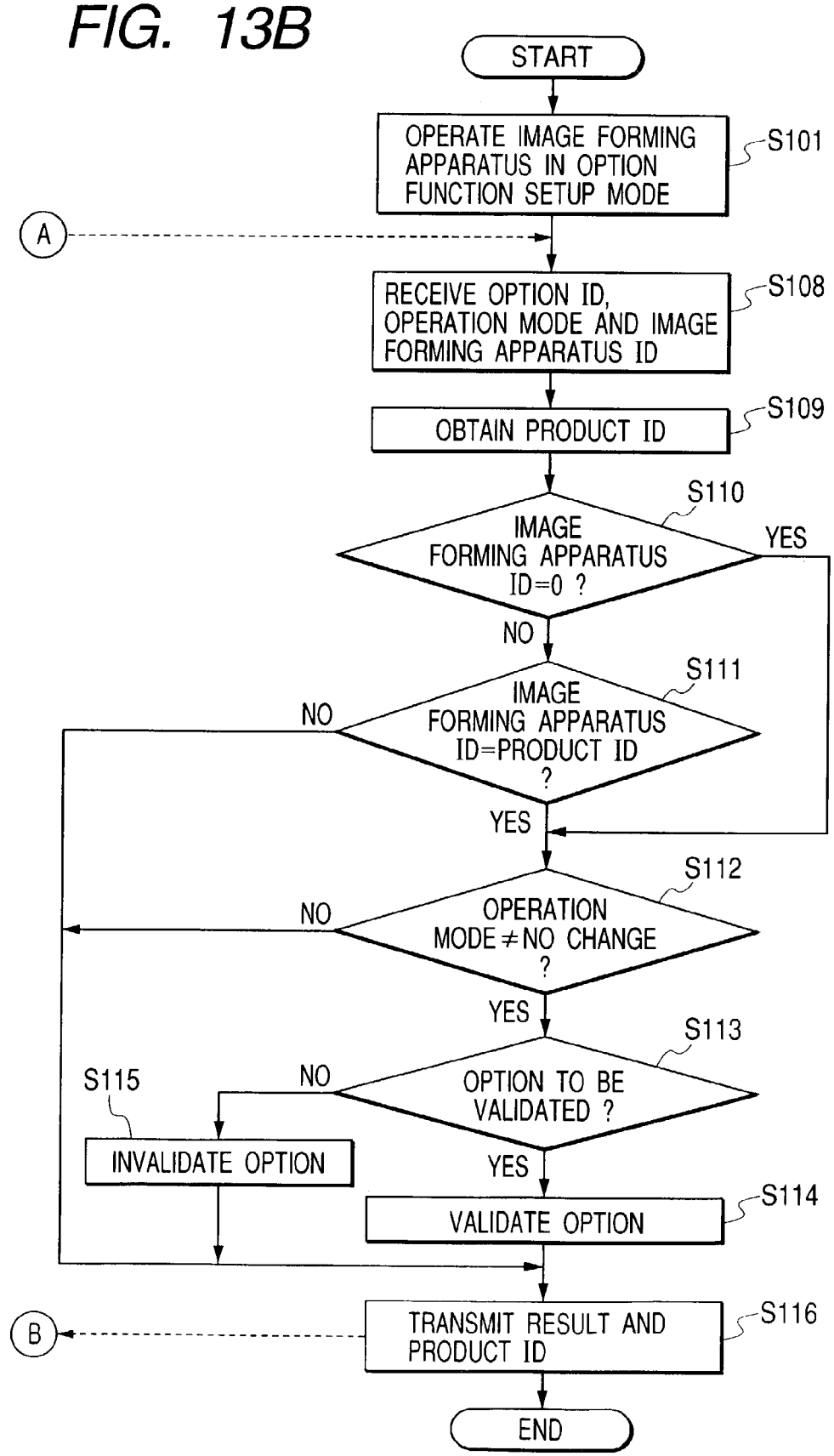

That is, FIGS. 13A and 13B are the flow charts showing an example of the option function setup processing procedure in the system to which the information processing apparatus and the image forming apparatus according to the second embodiment of the present invention are applicable. More specifically, FIG. 13A shows the process on the external apparatus side which is performed by the not-shown CPU's in the PC's 401 and 402 of FIG. 1 based on a program stored in a ROM, a hard disk or other storage medium, FIG. 13B shows the process on the image forming apparatus side which is performed by the not-shown CPU in the controller unit 110 of FIG. 1 based on a program stored in the ROM, the hard disk 600 or other storage medium, and symbols S101 to S121 shown in FIGS. 13A and 13B respectively denote the steps which are to be performed in the option function setup processing procedure.

First, in a step S101, on the image forming apparatus side, the "OK" key 701 on the option function setup mode screen 700 shown in FIG. 4 is depressed to cause the image forming apparatus to operate in an option function setup mode.

In such a state, an image forming apparatus option function setup tool is activated by a user on the external apparatus, and the external apparatus and the image forming apparatus are connected to each other through the communication medium such as the LAN 400 or the like. Then, it is judged in a step S102 whether or not the ID file can be read (or obtained) from the not-shown external storage medium connected to the external apparatus. If it is judged that the ID file can be read (or obtained) from the external storage medium, then, in a step S103, the ID file is read and decrypted by the external apparatus. Subsequently, on the external apparatus side, in a step S104, an image forming apparatus ID (i.e., the product ID stored in the product ID area 815) is read from the decrypted ID file, and the flow advances to a step S106.

On the other hand, if it is judged in the step S102 that the ID file cannot be read (or obtained) from the external storage medium (due to damage of the ID file, or no existence of the ID file), the flow advances to a step S105. Then, in the step S105, the image forming apparatus ID is provisionally set to "0" on the external apparatus side.

In the step S106, on the external apparatus side, an option ID and an operation mode input by the user through a not-shown option operation screen displayed on the external apparatus are obtained, and the flow advances to a step S107. Here, it should be noted that the option ID is the ID which is to discriminate the option function of the image forming apparatus, and the operation mode is the mode in which the operation to validate, to invalidate or not to change the option function corresponding to the selected option ID is performed.

Then, in the step S107, the option ID, the operation mode and the image forming apparatus ID are transmitted from the external apparatus to the image forming apparatus through the communication medium.

After then, in a step S108, the option ID, the operation mode and the image forming apparatus ID which are transmitted from the external apparatus are received by the image forming apparatus through the communication medium. Next, in a step S109, the product ID which has been stored in the product ID area 805 of the nonvolatile memory shown in FIG. 5 is read, and then it is judged in a step S110 whether or not the value of the image forming apparatus ID received from the external apparatus is "0." If it is judged that the value of the image forming apparatus ID is "0," the flow advances to a step S112 as it is.

On the other hand, if it is judged by the image forming apparatus in the step S110 whether or not the value of the image forming apparatus ID received from the external apparatus is not "0," the flow advances to a step S111 to judge whether or not the received image forming apparatus ID coincides with the product ID read from the nonvolatile memory. If it is judged that the received image forming apparatus ID does not coincide with the product ID read from the nonvolatile memory, the flow directly advances to a step S116.

On the other hand, if it is judged in the step S111 that the received image forming apparatus ID coincides with the product ID read from the nonvolatile memory, the flow advances to the step S112. In the step S112, it is judged by the image forming apparatus whether or not the received operation mode has been set to "no change." Here, if it is judged that the received operation mode has been set to "no change," the flow directly advances to the step S116. On the other hand, if it is judged in the step S112 that the received operation mode has been set to "change," the flow advances to a step S113 to further judge whether or not the operation mode has been set to "validation."

If it is judged in the step S113 that the operation mode has been set to "validation," the flow further advances to a step S114. In the step S114, the data of the option function flag area 806 corresponding to the received option ID is rewritten into "1" by the image forming apparatus to validate the option function so that the image forming apparatus can execute the option function in question. Then, the flow advances to the step S116.

On the other hand, if it is judged in the step S113 that the operation mode has been set to "invalidation," the flow further advances to a step S115. In the step S115, the data of the option function flag area 806 corresponding to the received option ID is rewritten into "0" by the image forming apparatus to invalidate the option function so that the image forming apparatus cannot execute the option function in question. Then, the flow advances to the step S116.

Finally, in the step S116, a setting result of the option function flag (i.e., "writing ends in success," "writing ends in failure," or "no writing") is transmitted from the image forming apparatus to the external apparatus through the communication medium, and the process on the image forming apparatus side ends.

Then, in a step S117, the setting result transmitted from the image forming apparatus is received by the external apparatus through the communication medium. Subsequently, it is judged in a step S118 whether or not the ID file exists in the not-shown external storage medium connected to the external apparatus. If it is judged that the ID file exists in the external storage medium, the process on the external apparatus side ends as it is.

On the other hand, if it is judged in the step S118 that the ID file does not exist in the external storage medium, the flow advances to a step S119 to create or generate the ID file. Then, in a step S120, the created ID file is encrypted by the external apparatus. Here, it should be noted that the encryption of the ID file may be performed in any method.

After then, in a step S121, the encrypted ID file is stored in the external storage medium by the external apparatus, and the process on the external apparatus ends.

As explained above, only in the case where the image forming apparatus ID of the ID file stored in the external storage medium of the external apparatus coincides with the product ID stored in the nonvolatile memory of the image forming apparatus or in the case where the ID file does not exist, the option function is set up. Thus circumstanced, even if the user illegally duplicates or copies the setup program with an evil intention, since the illegally duplicated plural setup programs are the identical program to which only the identical (or unique) ID file is used, he can merely set up the option function only for one image forming apparatus.

Therefore, in the case where the product ID stored in the external storage medium connected to the external apparatus coincides with the product ID stored in the nonvolatile memory of the image forming apparatus, it is possible to validate and invalidate the expansion function of the image forming apparatus. For this reason, it is possible to prevent the conventional problem that, if the user who owns only one setup program illegally duplicates it with the evil intention, the option function can be validated for the plural image forming apparatuses. Moreover, since the ID comparison process is performed on the image forming apparatus side, there is a significant effect of making falsification of the program on the external apparatus side difficult for a malicious user.

Incidentally, in the above embodiment, when the ID file does not exist on the external apparatus side, the own ID of the image forming apparatus itself is obtained from the image forming apparatus in question, the ID file is created (or generated) by using the obtained own ID as the image forming apparatus ID, the created ID file is encrypted and stored, and then the image forming apparatus is permitted to perform the option function setup process on the basis of the stored ID file. However, when the ID file exists on the external apparatus side, even in a case where any image forming apparatus ID is not stored in the ID file, it is similarly possible to update the ID file by using the own ID obtained from the image forming apparatus in question as the image forming apparatus ID, and it is also possible to permit the image forming apparatus to perform the option function setup process.

Moreover, it is possible to structure the image forming apparatus according to the present invention so as not to include any unit corresponding to the reader unit 200 as in the image input/output system 100 shown in FIG. 1.

Moreover, the image forming apparatus according to the present invention can be applied to an apparatus which consists of a single component or to a system which consists of plural apparatuses.

Moreover, the present invention can be applied not only to the case where the printer unit 300 shown in FIG. 1 adopts the laser beam system but also to a case where the printer unit 300 adopts an electrophotographic system (e.g., an LED system) other than the laser beam system, a liquid-crystal shutter system, an inkjet system, a thermal-transfer system, a dye sublimation system, or other system.

As described above, only in the case where the image forming apparatus ID of the ID file stored in the external storage medium coincides with the product ID stored in the nonvolatile memory of the image forming apparatus or in the case where the ID file does not exist, the option function is set up. By doing so, even if the user illegally duplicates or copies the setup program with an evil intention, since the illegally duplicated plural setup programs are the identical program to which only the identical (or unique) ID file is used, he can merely set up the option function only for one image forming apparatus. Therefore, it is possible to prevent the conventional problem that, if the user who owns only one setup program illegally duplicates it with the evil intention, the option function can be validated for the plural image forming apparatuses.

Moreover, according to the above first embodiment, since the ID comparison process is performed on the external apparatus side, it is unnecessary to change the programs on the plural image forming apparatus sides even if the ID comparison method is changed, whereby there is the significant effect of improving the correction operation in the option function setup procedure.

Besides, according to the above second embodiment, since the ID comparison means is provided on the image forming apparatus side, there is the significant effect of making falsification of the program on the external apparatus side difficult for the malicious user.

Hereinafter, the structures of data processing programs which can be read by the system to which the information processing apparatus and the image forming apparatus according to the present invention are applicable will be explained with reference to a memory map shown in FIG. 14.

FIG. 14 is the typical view for explaining an example of the memory map of the storage medium which stores the various data processing programs capable of being read by the system to which the information processing apparatus and the image forming apparatus according to the present invention are applicable.

Incidentally, although it is not particularly illustrated, information such as version information, information concerning a program creator, and the like for administrating the program group stored in the storage medium is stored together with the program group itself. Besides, information (e.g., an icon for discriminatively displaying a program) which depends on an OS or the like on the program reading side might be stored together.

Moreover, various data according to the various programs are held and administrated in a directory on the above storage medium. Besides, in a case where a program and data to be installed have been compressed, a program or the like to decompress the compressed program and data might be stored together.

The functions which are shown in FIGS. 7A, 7B, 13A and 13B according to the embodiments of the present invention may be executed by a host computer on the basis of an externally installed program. In this instance, the present invention is of course applied even to a case where an information group including the program is supplied to an output apparatus from storage media such as a CD-ROM, a flash memory and the like or from an external storage medium through a network.

As described above, it is needless to say that the object of the present invention can be achieved in a case where a storage medium storing the program codes of software to realize the functions of the above embodiments is supplied to a system or an apparatus and then a computer (or CPU or MPU) in the system or the apparatus reads and executes the program codes stored in the storage medium.

In this case, the program codes themselves read from the storage medium realize the new functions of the present invention, whereby the storage medium storing these program codes constitutes the present invention.

As the storage medium from which the program codes are supplied, e.g., a floppy(™) disk, a hard disk, an optical disk, a magnetooptical disk, a CD-ROM, a CD-R, a DVD-ROM, a magnetic tape, a nonvolatile memory card, a ROM, an EEPROM, a silicon disk and the like can be used.

Moreover, it is needless to say that the present invention includes not only a case where the functions of the above embodiments are realized by executing the program codes read by the computer, but also a case where an OS (operating system) or the like functioning on the computer executes a part or all of the actual process according to the instructions of the program codes, and the functions of the above embodiments are achieved by such processes.

Moreover, it is needless to say that the present invention also includes a case where, after the program codes read from the storage medium are written into a function expansion board inserted in the computer or a memory in a function expansion unit connected to the computer, a CPU or the like provided in the function expansion board or the function expansion unit performs a part or all of the actual processes on the basis of the instructions of the program codes, and thus the functions of the above embodiments are realized by such processes.

The present invention is applicable to a system composed of plural apparatuses or to a single apparatus. Moreover, it is needless to say that the present invention is also applicable to a case where the functions of the above embodiments are realized by supplying a program to the system or the apparatus. In this case, when the storage medium storing the program represented by the software for achieving the present invention is read by the system or the apparatus, the system or the apparatus can obtain the significant effects of the present invention.

Moreover, when the program represented by the software for achieving the present invention is downloaded and read from a database on a network on the basis of a communication program, the system or the apparatus can obtain the significant effects of the present invention.

As explained above, according to the present invention, in the case where only one image forming apparatus ID which is stored in the information processing apparatus coincides with the own ID of the image forming apparatus itself which is stored in the image forming apparatus, it is controlled to perform the setup process to the option function of the image forming apparatus in accordance with the information which concerns the validation and invalidation of the option function of the image forming apparatus and is instructed on the information processing apparatus. On the other hand, in the case where only one image forming apparatus ID which is stored in the information processing apparatus does not coincide with the own ID of the image forming apparatus itself which is stored in the image forming apparatus, it is controlled not to perform the setup process to the option function of the image forming apparatus according to the information which concerns the validation and invalidation of the option function of the image forming apparatus and is instructed on the information processing apparatus. Therefore, even if the malicious user illegally or unfairly duplicates or copies the setup program, he can merely set up the option function for only one image forming apparatus. Therefore, it is possible to prevent the conventional problem that the malicious user who owns only one setup program illegally or unfairly duplicates it with evil intention and thus he can validate or invalidate the option function for the plural image forming apparatuses.

As many apparently widely different embodiments of the present invention can be made without departing from the spirit and scope thereof, it is to be understood that the present invention is not limited to the specific embodiments thereof expect as defined in the appended claims.

What is claimed is:

1. An option function setup method which sets up an option function of an image forming apparatus from an information processing apparatus connected to the image forming apparatus though a communication medium, said method comprising:
    an instruction step of instructing validation and invalidation of the option function of the image forming apparatus from the information processing apparatus;
    a comparison step of comparing only one image forming apparatus ID stored in the information processing apparatus with an own ID of the image forming apparatus itself stored in the image forming apparatus;
    a setup step of performing, in a case where as a compared result in said comparison step only one image forming apparatus ID stored in the information processing apparatus coincides with the own ID of the image forming apparatus itself stored in the image forming apparatus, a setup process for the option function of the image forming apparatus according to information concerning the validation and invalidation of the option function of the image forming apparatus instructed on the information processing apparatus side; and a non-setup step of not performing, in a case where as a compared result in said comparison step only one image forming apparatus ID stored in the information processing apparatus does not coincide with the own ID of the image forming apparatus itself stored in the image forming apparatus, the setup process for the option function of the image forming apparatus according to the information concerning the validation and invalidation of the option function of the image forming apparatus instructed on the information processing apparatus side.

2. An option function setup method according to claim 1, further comprising a storing step of storing the own ID of the image forming apparatus itself as the image forming apparatus ID in a case where any image forming apparatus ID does not exist in the information processing apparatus, wherein said setup step includes performing the setup process for the option function of the image forming apparatus even in the case where any image forming apparatus ID does not exist in the information processing apparatus.

3. An option function setup method according to claim 1, further comprising a setup mode change step of changing a mode of the image forming apparatus to a setup mode to perform setting of the option function of the image forming apparatus.

4. An option function setup method according to claim 1, wherein the image forming apparatus ID is encrypted and then stored in the information processing apparatus, and said method further comprises a description step of decrypting the encrypted and stored image forming apparatus ID.

* * * * *

UNITED STATES PATENT AND TRADEMARK OFFICE
CERTIFICATE OF CORRECTION

PATENT NO.        : 7,289,238 B2
APPLICATION NO.   : 10/440232
DATED             : October 30, 2007
INVENTOR(S)       : Hirochika Sato It is certified that error appears in the above-identified patent and that said Letters Patent is hereby corrected as shown below:

ON THE TITLE PAGE [56] REFERENCES CITED:

Foreign Patent Documents, "JP 2002011924A  1/2002"
    should read --JP 2002-011924  A  1/2002--.

COLUMN 1:

Line 26, "being operating" should read --being operated--.

COLUMN 3:

Line 43, "(or PC's)" should read --(or PCs)--; and
Line 63, "panel acts" should read --panel, and which acts--.

COLUMN 4:

Line 1, "denotes" should read --denote-- and
    "(PC's)." should read --(PCs).--;
Line 2, "(PC's)" should read --(PCs)--; and
Line 39, "simply" should read --for short--.

COLUMN 6:

Line 12, "stat key" should read --start key--; and
Line 49, "setting" should read --settings--.

COLUMN 8:

Line 23, "that that," should read --that,--; and
Line 49, "such the" should read --such--.

COLUMN 9:

Line 51, "in case" should read --in the case--;
Line 59, "tempering with" should read --tampering with--; and
Line 65, "tempering with" should read --tampering with--.

UNITED STATES PATENT AND TRADEMARK OFFICE
CERTIFICATE OF CORRECTION

PATENT NO. : 7,289,238 B2
APPLICATION NO. : 10/440232
DATED : October 30, 2007
INVENTOR(S) : Hirochika Sato It is certified that error appears in the above-identified patent and that said Letters Patent is hereby corrected as shown below:

<u>COLUMN 15</u>:

Line 13, "At the last," should read --Lastly,--.

<u>COLUMN 20</u>:

Line 43, "expect" should read --except--; and
Line 48, "though" should read --through--.

Signed and Sealed this

First Day of July, 2008

JON W. DUDAS
*Director of the United States Patent and Trademark Office*